Dec. 19, 1961   J. P. GILLIAM   3,013,579
FLIP POPPET VALVE
Filed Feb. 9, 1961
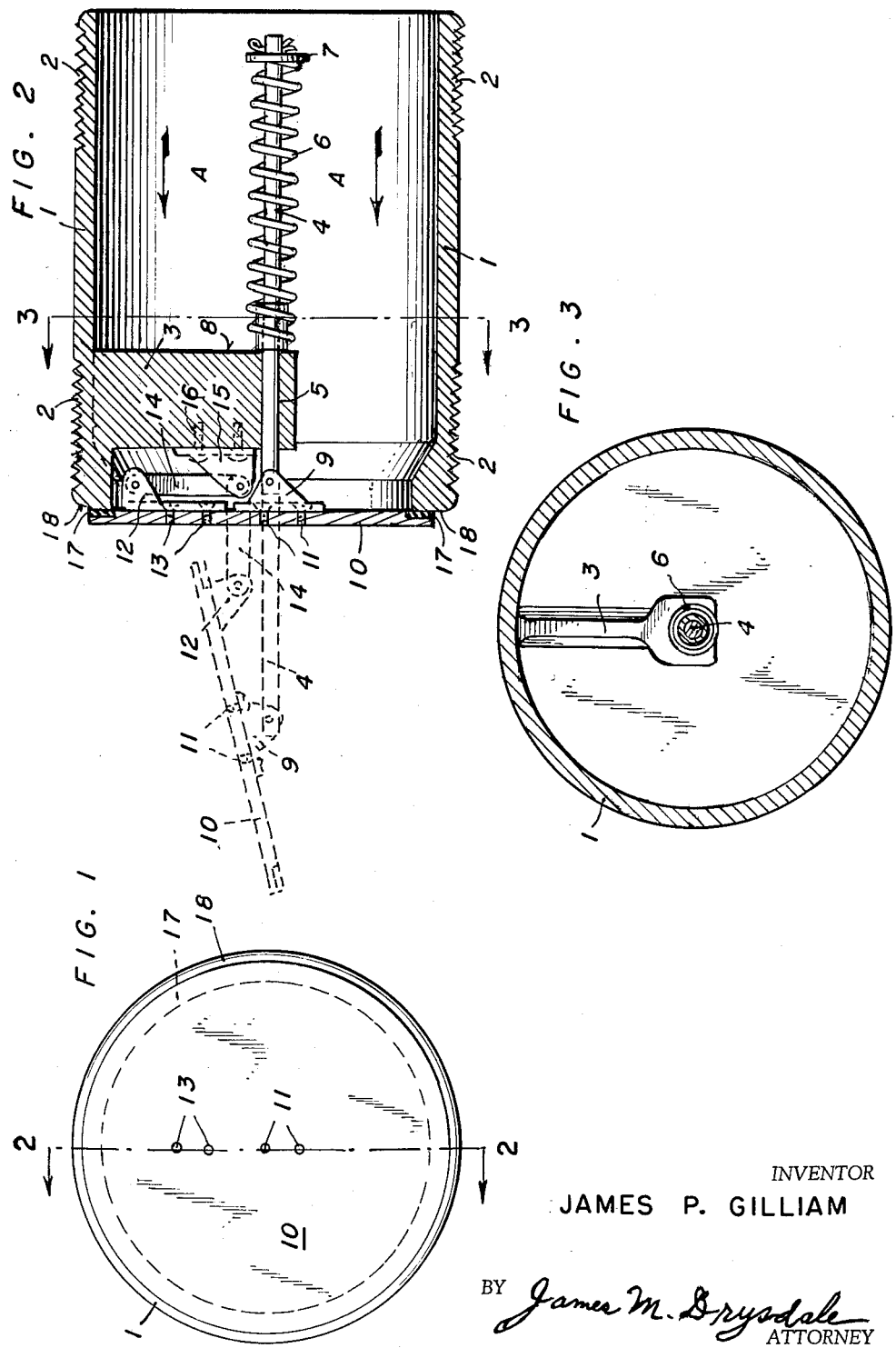
INVENTOR
JAMES P. GILLIAM
BY *James M. Drysdale*
ATTORNEY

United States Patent Office 3,013,579
Patented Dec. 19, 1961

3,013,579
FLIP POPPET VALVE
James P. Gilliam, R.F.D. 1, Box 596, De Land, Fla.
Filed Feb. 9, 1961, Ser. No. 97,121
3 Claims. (Cl. 137—515.5)

This invention relates to an improvement in pivoted disc or hinged disc valves adapted for use as poppet or check valves and therefore may be defined as a flip poppet check valve. One object of the invention is directed to the provision of a valve structure of the type referred to wherein is provided a central tubular body structure, threaded outwardly at its ends and having associated therewith the disc and seat members and other parts of the valve structure which can be easily removed as a whole from the pipe line since the outwardly threaded body structure inwardly engages the inwardly threaded ends of the pipe line.

It is well known that the seating surfaces of the coacting surfaces of valves become worn, scored or injured and the valves are otherwise rendered unsuitable for service and therefore it is desirable that the valve structure be easily disconnected from the pipe line for repairs, replacement, and the like.

Another object is the installation of the valve and its seat in any desired manner but is more particularly adapted for providing a valve housing complete as an independent unit for insertion in a pipe line along with its valve closing element and valve seat.

This unit may be readily installed in place with a minimum of effort and can be manufactured and assembled at low cost. Both the valve seat on the disk and the valve seat on the housing may be formed of stainless steel or other suitable wear-resisting material, the valve seat on the disk is preferably faced with rubber whereby the accuracy of the original adjustment will be maintained over a long period of use.

Another object of the invention is to provide an improved valve structure for a variety of uses especially as a pivot check valve of silent operation.

A further object of the invention is to provide a valve of the character just mentioned wherein various working pressures may be controlled with a high degree of promptness of reaction of the valve member and yet without shock or noise. Another object of this invention is to provide an improved valve of simplified construction, economical to manufacture and whose parts may be easily assembled as well as readily replaced or repaired in the event of accidental injury or wear induced by the fluids handled at the point of installation.

Various other novel objects and advantages of the invention will be hereinafter more fully referred to in connection with the accompanying description of the preferred form of the invention with reference to the drawing, wherein:

FIG. 1 is a front elevation of the valve structure showing the valve disc in closed position.

FIG. 2 is a sectional view of the valve structure along the line 2—2 of FIG. 1 looking in the direction of the arrows 2 showing the valve disc in closed position and in dotted lines in partially open position.

FIG. 3 is a sectional view along the line 3—3 of FIG. 2 looking in the direction of the arrows 3.

Referring to the drawings more in detail, the invention will now be fully described.

The valve structure as illustrated consists of a cylindrical housing 1 having external threads 2 at each end which mesh with the internal threads on the end of a pipe section when the valve structure is assembled in the pipe line.

The housing 1 is provided near one end with an inwardly projecting flange 3 of suitable width which extends beyond the central portion of the housing. A rod 4 passes longitudinally along the central axis of the cylindrical housing and through a guiding hole 5 which passes through the end of the projecting flange 3. A coil compression spring 6 surrounds the rod 4 and bears at its outer end against a washer or disk 7 mounted at the outer end of the rod 4. At its inner end the compression spring 6 bears against the face 8 of the inwardly projecting flange 3. At its inner end the rod 4 is swivelled or pivoted to a projecting piece 9 attached to the center of the valve disk 10 by means of screws 11.

Near the outer edge of the valve disk 10 is attached another projecting piece 12 by means of screws 13. A short rod 14 is swivelled or pivoted at one end to the projecting piece 12 and at the other end to another projecting piece 15 attached to the projecting flange 3 by means of the screws 16. The outer edge of the valve disc 10 is faced with a narrow band 17 of rubber which bears against the valve seat 18 on the housing when the valve is in closed position whereby the valve is rendered water tight and the accuracy of the original adjustment is maintained over a long period of use.

The valve structure above described may be used for fluid distribution lines of various pressures and has been constructed in various sizes, including very large valves for heavy duty installation as well as medium sized valves to be installed in pipe lines of 2, 3, 4 or more inches in diameter.

The operation of the valve structure will be readily apparent from the above description and a careful inspection of FIG. 2 of the drawing. Looking at this figure it will be readily apparent that the water in the pipe line flowing in the direction indicated by the arrows A will force open the valve disk 10 which normally is held closed by the tension imparted to the rod 4 by the coil compression spring 6. The valve disk 10, short rod 14 and associated parts are indicated by dotted lines in FIG. 2 to show the valve in open position. When the valve is in closed position the short rod 14 assumes a position at right angles to the rod 4 which moves longitudinally along the central axis of the cylindrical housing. When the valve is in fully open position the short rod 14 assumes a position parallel to the rod 4.

While we have described the invention in great detail and with respect to the present preferred form thereof, it is not desired to be limited thereto since changes and modifications may be made therein without departing from the spirit and scope of the invention. The invention may be embodied in other specific forms without departing from the essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A flip poppet check valve structure comprising a cylindrical housing externally threaded at each end and having an inwardly projecting flange extending beyond the central portion of the housing, a rod extending along the central axis of the housing and passing through a hole which passes through the end of the projecting flange, a coil compression spring surrounding said rod and bearing at its outer end against a washer or disk mounted on the outer end of said rod and bearing at its inner end against the face of the inwardly projecting flange, a valve disk, a projecting piece attached to the center of said disk and pivoted to the inner end of said rod, a short rod, another projecting piece attached near the edge of said disk and pivoted to one end of said short rod, another projecting piece attached to the inwardly projecting flange and pivoted to the other end of said short rod whereby when fluid pressure is applied to the inner face of the valve disk, the valve will be opened and when fully opened, the short rod assumes a position parallel to the central axis of the cylindrical housing.

2. A valve structure comprising a cylindrical housing having an inwardly projecting flange extending beyond the central portion of the housing, a rod extending along the central axis of the housing and passing through a hole which passes through the end of the projecting flange, a coil compression spring surrounding said rod and bearing at its outer end against a washer or disk mounted on the outer end of said rod and bearing at its inner end against the face of the inwardly projecting flange, a valve disk, a projecting piece attached to the center of said disk and pivoted to the inner end of said rod, a short rod, another projecting piece attached near the edge of said disk and pivoted to one end of said short rod, another projecting piece attached to the inwardly projecting flange and pivoted to the other end of said short rod whereby when fluid pressure is applied to the inner face of the valve disk, the valve will be opened and when fully opened, the plane of the valve disk assumes a position parallel to the central axis of the cylindrical housing.

3. An apparatus as claimed in claim 2 wherein said valve element consists of a disk having a valve seat faced with rubber whereby the valve is rendered water-tight and the accuracy of the original adjustment will be maintained over a long period of use.

No references cited.